(12) United States Patent
Dispagne et al.

(10) Patent No.: US 11,132,917 B2
(45) Date of Patent: Sep. 28, 2021

(54) METHOD, SYSTEM AND COMPUTER PROGRAM PRODUCT FOR COMPENSATION OF SIMULATOR CONTROL LOADING MECHANICAL EFFECTS

(71) Applicant: THALES, Courbevoie (FR)

(72) Inventors: Rémy Dispagne, Magny en Vexin (FR); René Le Guillou, Maurepas (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/954,505

(22) PCT Filed: Dec. 20, 2018

(86) PCT No.: PCT/EP2018/086230
§ 371 (c)(1),
(2) Date: Jun. 16, 2020

(87) PCT Pub. No.: WO2019/122148
PCT Pub. Date: Jun. 27, 2019

(65) Prior Publication Data
US 2021/0090456 A1    Mar. 25, 2021

(30) Foreign Application Priority Data
Dec. 22, 2017    (EP) .................................. 17306906

(51) Int. Cl.
*G09B 9/28*    (2006.01)
*G09B 9/12*    (2006.01)

(52) U.S. Cl.
CPC ................. *G09B 9/28* (2013.01); *G09B 9/12* (2013.01)

(58) Field of Classification Search
CPC ... G09B 9/02; G09B 9/04; G09B 9/06; G09B 9/08; G09B 9/01; G09B 9/12; G09B 9/16;
(Continued)

(56) References Cited

U.S. PATENT DOCUMENTS

| | | |
|---|---|---|
| 3,220,121 A | 11/1965 | Ernest |
| 3,463,866 A | 8/1969 | Staples |

(Continued)

*Primary Examiner* — Timothy A Musselman
(74) *Attorney, Agent, or Firm* — BakerHostetler (57) ABSTRACT

The invention provides a method and system for controlling a control instrument of a simulation system reproducing a desired system, in response to a force applied onto the control instrument. The method allows detecting a force applied onto the control instrument by a pilot of the simulation system, and generating a force sensor signal representing the detected force; detecting a motion of the control instrument and generating motion parameters; generating a desired response force signal from the motion parameters, the desired response force signal representing the forces that would be exerted by the desired system to reproduce; generating a system response force signal from the force sensor signal and the motion parameters, the system response force signal representing the forces exerted by the behaviour of mechanical parts of the simulation system; generating a force sum signal from the desired response force signal, the system response force signal and the force sensor signal; and generating control signals from the force sum signal.

10 Claims, 6 Drawing Sheets

(58) Field of Classification Search
CPC . G09B 9/20; G09B 9/28; G09B 9/288; G09B 9/30
See application file for complete search history.

(56) References Cited

U.S. PATENT DOCUMENTS

| | | | |
|---|---|---|---|
| 4,236,325 A | | 12/1980 | Hall et al. |
| 5,044,956 A | * | 9/1991 | Behensky ............... A63F 13/57 434/45 |
| 5,634,794 A | | 6/1997 | Hildreth et al. |

* cited by examiner

METHOD, SYSTEM AND COMPUTER PROGRAM PRODUCT FOR COMPENSATION OF SIMULATOR CONTROL LOADING MECHANICAL EFFECTS

CROSS-REFERENCE TO RELATED APPLICATIONS

This application is a National Stage of International patent application PCT/EP2018/086230, filed on Dec. 20, 2018, which claims priority to foreign European patent application No. EP 17306906.3, filed on Dec. 22, 2017, the disclosures of which are incorporated by reference in their entirety.

FIELD OF THE INVENTION

The present invention relates to simulators and more particularly to a method and system for compensating mechanical effects of control loading devices in simulators.

BACKGROUND OF THE INVENTION

Simulators of vehicle (flight simulators or automotive simulators) generally comprise a plurality of simulated controls which must reproduce the 'look and feel' of the corresponding real control in a real vehicle in terms of design, force feedback, frictions, dynamics behaviour and so. When achieved, this allows a pilot of the simulator to get a representative training as he would actually experience in the real vehicle.

Recent advances in simulation technology have increased fidelity and created a more secure training environment to accurately reproduce the 'look and feel' of the real vehicle. Furthermore, every instrument inside a simulator must function identically to their real-world counterparts. However, one of the most difficult tasks for instrument simulation is to realistically reproduce according to the simulated conditions, the efforts on the control instruments, such as efforts on pedals, or push/pull and turn left/right efforts on the yoke for flight simulators. To achieve, a flight simulator is provided with a Control Loading System (CLS), also called force feedback system, used to provide pilots with realistic flight control forces. The aim of the Control Loading System is to model the loading conditions and provide to the pilot feedback forces required on the control instruments (mainly on the yoke and pedals as the primary controls instruments). The Control Loading System is the sensitive human-machine interface in simulators that have a major impact on a successful training because it has to provide an authentic reproduction of what happens in the aircraft and a realistic simulation of failure modes.

To reproduce the efforts, an actuator is fed with a signal computed in a feedback control loop taking into account the stick position and the measure by a force sensor of the force the pilot actually exerts on the flight control. The feedback control loop is generally a software simulated model of the real stick mechanics, dynamics and so on. Such model to reproduce the right feeling has to take into account the real aircraft system but also the simulator system. Furthermore, the system inertia is replaced by the aircraft real inertia to obtain the right force feedback.

U.S. Pat. No. 4,236,325 from Hall et al. discloses a feedback control loop employed in aircraft simulators. In the control loop model, an inertia compensation is implemented which aim is to remove the inertia of the simulator control instruments. The computation of the inertia compensation is based on a feedback loop that uses the actuator acceleration multiplied by a given mass, as expressed by the Newton's $2^{nd}$ law: $\Sigma F=m*a$, with "m" being the equivalent mass of the simulator control instrument and "a" the actuator acceleration. This gives the force "F" created by the mass of the control in the simulator. This force is then subtracted to the total sum of all the other forces (force sensor, frictions, force feedback . . . ) that are applied to the system. By applying the force subtraction, the inertia due to the simulator control is removed and nearly identical dynamics can be obtained compared to the real aircraft, particularly when it comes to high dynamics.

However, this approach for inertia compensation suffers from two major side-effects. The worst one is the generation of unrealistic and unwanted rebounds when hitting mechanical stops or when hitting even slightly the stick with the hand. This major drawback makes this method unusable in a context of a real simulated product intended for pilot training, as this would lead to negative or even dangerous training.

Another side effect of known inertia compensation approach is that it does not take into account the mechanical effects of the real simulated product (such as frictions, damping . . . ) that are measured by the force sensor. To obtain an optimal compensation, the system has to take into account all the effects or forces that apply, not only the inertia effects. It does not take into account the force sensor dynamics either. The mechanical effect compensation forces to be subtracted must efficiently model the mechanical effects as seen by the force sensor before being subtracted.

In U.S. Pat. No. 5,634,794 from Hildreth et al. a method for simulating a desired response in accordance with an external applied force is disclosed. A control loader allows exerting a controlled force on a load target, the control loader having an actuator, a first force sensor, a second force sensor, and a control portion for controlling the actuator in response to the first and second sensors. The first force sensor is disposed to detect the external force exerted on the load target and is coupled to the mechanical linkages which transmit the forces from the actuator to the load target. The second force sensor is connected to the actuator to measure the force generated by the actuator. The control portion includes a desired response model for the control loader system. The signals from the first and second force sensors are input to the control portion, and the control portion generates a control signal to the actuator so that the actuator provides the desired response. A system response model portion determines the expected response of the simulator system itself to the force on the load target. The system response model portion compensates for the inertia, vibration, damping, friction, etc. of the control loader system itself in determining how the actuator should respond to the force. The desired response model portion generates an output as if the simulator itself had no mass, damping or spring loading. Since the simulator does have such characteristics, the system response model portion provides feed forward compensation for such factors. However, a major drawback of this approach is that the desired response model does not strictly represent the desired system to reproduce, as the whole concept stands on the assumption that the detected force on the load target ($F_{in}$) is the only force from the load target, and the mechanical effects of the load target are not taken into account. The result of this is easily understandable in the case of a dynamic test when no external force (e.g. the pilot not touching the stick) applies and the device generating a model torque (or force) $F_d(x)$ is a spring circuit. The system will then oscillate depending on its parameters. In this case, $F_{in}$ is a non-null value representing load target mechanical effect forces such as inertia, friction, and so on. This force is injected as is (called FORC') into the desired response model. Since this force (FORC') contains such simulator dependent mechanical effects, the desired response model does not behave as if the simulator had no mass, damping, or spring loading. The resulting outputs are then biased but still contribute to determine the desired control commands, leading to a biased behavior different from the desired system to reproduce. Another drawback of U.S. Pat. No. 5,634,794 from Hildreth et al. is that it requires two force sensors, i.e. two signal acquisition devices, increasing thus the cost of the final product.

Thus, there is a need for a solution that removes the aforementioned drawbacks and that offers a system and a method for mechanical effects compensation of control instruments in simulators. More generally, there is a need for a system and a method providing a desired response model of a device under simulation to reproduce authentically the behavior of the desired system. The present invention offers such solution.

SUMMARY OF THE INVENTION

It is an object of the present invention to provide a system that offers a desired response model to be an actual model of a desired system to reproduce.

According to a first aspect of the present invention, there is provided a method as further described in the appended independent claim 1.

Particularly, a method for controlling a control instrument of a simulation system reproducing a desired system, in response to a force applied onto said control instrument, comprises the steps of:

detecting a force applied onto the control instrument of the simulation system, and generating a force sensor signal representing the detected force;
detecting a motion of the control instrument and generating motion parameters;
generating a desired response force signal from the motion parameters, the desired response force signal representing the forces that would be exerted by the desired system to reproduce;
generating a system response force signal from the force sensor signal and the motion parameters, the system response force signal representing the forces exerted by the behaviour of mechanical parts of the simulation system;
generating a force sum signal from the desired response force signal, the system response force signal and the force sensor signal; and
generating control signals from the force sum signal.

Further embodiments are described in the appended dependent claims.

According to a second aspect of the present invention, there is provided a system comprising means adapted for carrying out each step of the method according to the first aspect of the invention.

According to a third aspect of the present invention, there is provided a computer readable medium having encoded thereon a computer program comprising instructions for carrying out the steps of the method when the computer program is executed on a computer.

Further advantages of the present invention will become clear to the skilled person upon examination of the drawings and detailed description. It is intended that any additional advantages be incorporated therein.

BRIEF DESCRIPTION OF THE DRAWINGS

Embodiments of the present invention will now be described by way of example with reference to the accompanying drawings in which like references denote similar elements, and in which.

DETAILED DESCRIPTION OF THE PREFERRED EMBODIMENT

Figure 1:
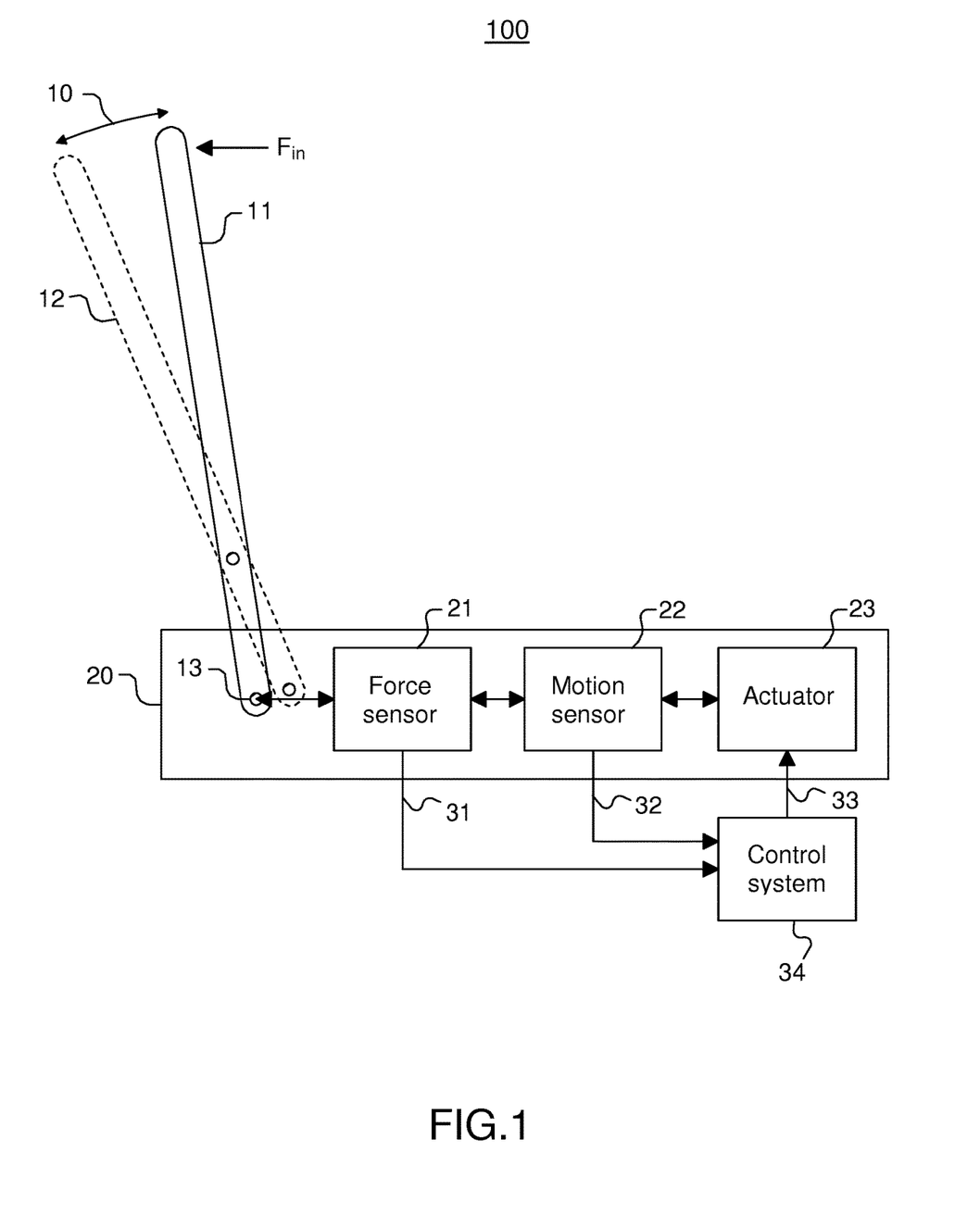
FIG. 1 is a block diagram of a Control Loading System of the present invention.

Referring FIG. 1, a block diagram of a Control Loading System (100) for implementing the present invention is depicted in accordance with a preferred embodiment. To recall, the goal of the CLS is to reproduce with enough sense of fidelity the behavior of a desired system on a simulated control instrument. As exemplified on FIG. 1, the CLS allows reproducing the behavior of a control stick (11) of an aircraft when a pilot trainee interacts with it by applying a force "$F_{in}$" to the stick. As shown, control stick (11) can move along a trajectory (10) to an arbitrary position (12). A module (20) of mechanical components (21, 22, 23) of the Control Loading System is coupled to the control stick (11) by a junction (13). The control stick (11) is coupled to a force sensor (21) which outputs a force sensor signal (31) representative of the force exerted on the control stick (11). Force sensor signal (31) is input to a control system (34). Force sensor (21) is further coupled to a motion sensor (22) which allows measuring the motion of the system, i.e. measuring acceleration, velocity, position or any combination of these parameters. Motion sensor (22) outputs a motion signal (32) which may be composed of any combination of acceleration, velocity and position parameters measured by motion sensor. Motion signal (32) is input to control system (34). Motion sensor (22) is further coupled to an actuator (23) which allows providing a force feedback according to specific control laws such as spring force or friction laws. In the context of a control stick in an aircraft simulator, the actuator is in charge of reproducing the real aircraft control stick behavior such that the pilot trainee in the simulator feels as if he were piloting the real aircraft. Actuator (23) is further coupled to control system (34) to receive as input a control signal (33) output from control system (34), the control signal being representative of a control command, composed of any combination of acceleration (or torque or force), velocity and position, to be executed by the actuator (23). In a preferred embodiment, actuator (23) is composed of an electrical motor with an encoder allowing grouping motion sensor (22) and actuator (23) in a single block. As further detailed, control system (34) generates control signal (33) based on motion signal (32) and force sensor signal (31).

Figure 2:
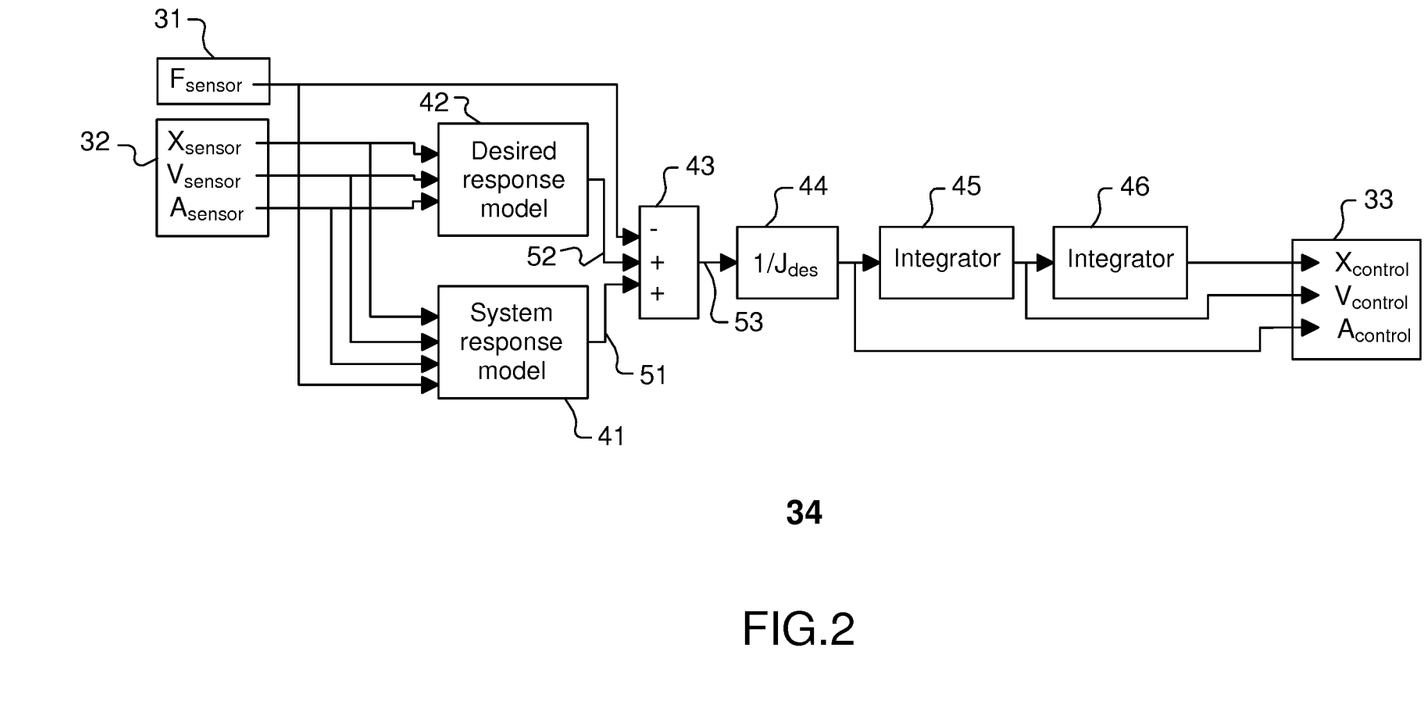
FIG. 2 details the feedback control loop of the CLS of FIG. 1 in accordance with an embodiment of the present invention.

Going to FIG. 2, a detailed description of a preferred embodiment of control system (34) of FIG. 1 is now given. Control system (34) may be implemented as a CLS computing device dedicated to handle as inputs force sensor and motion signals (31, 32) and for computing as output control signal (33) representative of a command to be applied to actuator (23). Even if not represented, CLS computer may communicate with various external systems, such as host computers, cloud based network to name a few.

As previously mentioned, motion signal (32) is any combination of acceleration parameter "$A_{sensor}$", velocity parameter "$V_{sensor}$" and position parameter "$X_{sensor}$" that are measured by motion sensor (22). Motion signal (32) can advantageously be augmented with any combination of control signal (33) component. Motion signal (32) is fed to a desired response model module (42) and to a system response model module (41).

The function of the desired response model module (42) is to provide a model of the desired system to reproduce. As such, in the context of an aircraft simulator, the desired response model module (42) as detailed on FIG. 4, allows representing the control stick mechanics including for example spring box (71), frictions (72), damping effects and other mechanical effects (not represented). The desired response model module (42) outputs a desired response force signal "$F_{des}$" (52) representing the total force, after summing the forces in a summer (73), that would be exerted by the desired system.

The force sensor signal (31) and motion signal (32) are fed to a system response model module (41) which function is to provide a model of the behavior of the mechanical components of the CLS as measured by the force sensor (21). In the context of an aircraft simulator, the mechanical components behavior includes mechanical parts inertia, frictions, damping effects and other mechanical effects exerted by the system itself, including possible nonlinear effects and mechanical structure modification effects. The system response model module (41) outputs a system response force signal (51).

Force sensor signal (31), desired response force signal (52) and system response force signal (51) are summed into a summer (43). The force sum signal (53) that is obtained represents the sum of all the forces that applies to the system.

The system response model module (41) of the present invention represents the mechanical behavior of the system. Advantageously as further detailed with reference to FIG. 3, the system response model module (41) of the present invention is configured with a precision allowing to have a force sum signal (53) that represents the force required for the actuator to move the system as if the desired response model alone would have move. Provided the desired response model module is configured with enough fidelity compared to the desired system, the movement of the system thus obtained represents the desired system movement with said fidelity.

The force sum signal (53) is amplified in an amplifier (44) which represents the mechanical inertia "$M_{des}$" (or equivalent mass) of the desired response model module (i.e. the inertia of the desired system). The amplifier (44) outputs an acceleration control signal "$A_{control}$". The acceleration control signal may be integrated by an integrator (45) to provide a velocity control signal "$V_{control}$", and this latter may be integrated by an integrator (46) to provide a position control signal "$X_{control}$". The acceleration control signal, the velocity control signal and the position control signal may be used as part of the control signal (33) fed to command the actuator (23).

Figure 3:
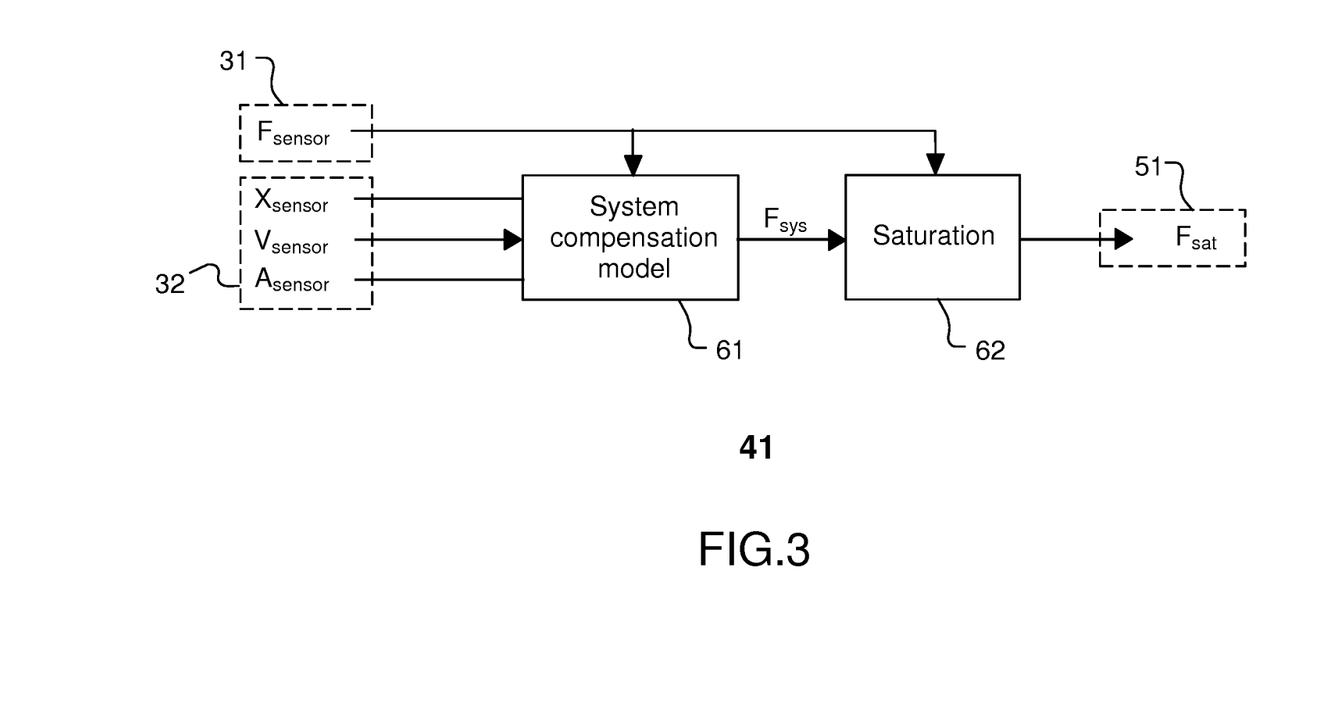
FIG. 3 details the system response model block of FIG. 2 in accordance with an embodiment of the present invention.

FIG. 3 details the system response model module (41) of the present invention in a preferred embodiment. Motion signal (32) composed of any combination of acceleration parameter "$A_{sensor}$", velocity parameter "$V_{sensor}$" and position parameter "$X_{sensor}$", is fed to a system compensation model module (61) which function is to model the behavior of the mechanical components of mechanical module (20) of the CLS as they are measured by force sensor (21). System compensation model module (61) takes into account the force sensor dynamics (i.e. its transfer function). As previously exposed, in the context of an aircraft simulator, the system compensation model module (61) represents the behavior of the control stick and other mechanical components linked to it and interacting, namely: mechanical parts inertia, frictions, damping effects and other mechanical effects or forces exerted by the system itself, including possible nonlinear effects and mechanical structure modification effects, such as mechanical stops for example.

System compensation model module (61) outputs a system compensation force signal "$F_{sys}$" which is fed to a saturation device (62). Saturation device (62) outputs a saturated system response force signal "$F_{sat}$" (51). Using the force sensor signal "$F_{sensor}$" (31), saturation device (62) saturates the system compensation force signal "$F_{sys}$" to a range $[-F_{sensor}, +F_{sensor}]$. Advantageously, saturation device (62) ensures the system response model module (41) does not generate any active force which would lead to unwanted behavior of the system. Still advantageously, by saturating the system compensation force signal in a range depending on the force sensor signal, the saturation device (62) allows encompassing some implementations where a system compensation model module (61) would not reproduce with enough fidelity the behavior of the mechanical components of the system.

Figure 4:
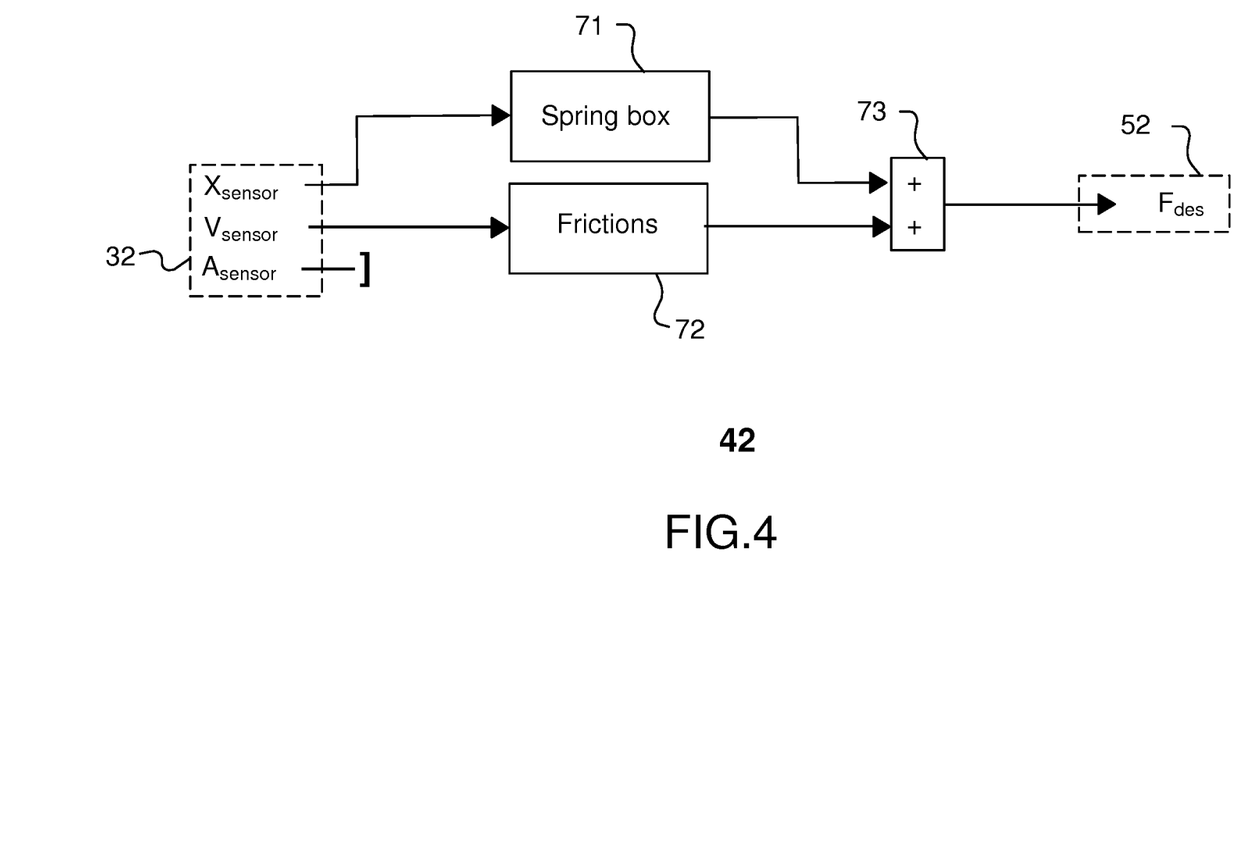
FIG. 4 details the desired response model block of FIG. 2 in accordance with an embodiment of the present invention.

Going into details of FIG. 4, an embodiment of a desired response model module (42) in the context of an aircraft simulator is described. The function of desired response model module (42) is to reproduce with great authenticity the mechanical effects of the control stick of a real aircraft. A real aircraft control stick, or say a pitch axis of a helicopter, includes a spring box which defines the control stick rest position, and exerts an effort that a pilot feels whenever he pushes or pulls the stick. When the pilot releases the stick, this latter goes back on its own to the rest position thanks to the spring effect. In the desired response model of the present invention for an aircraft simulator, a spring box (71) modelizes this spring effect or spring force based on the stick position "$X_{sensor}$". For example, as a general approximation, the output value may be modelized by the following equation: $F_{spring} = K_s * X_{sensor}$ with "$F_{spring}$" being the output force of spring box (71) and "$K_s$" being a force constant.

The pitch axis also includes frictions—dry and viscous frictions—that also apply to the stick. These frictions represent the friction forces appearing between mechanical components of the rods when they are moving. As such in the desired response model module of the present invention, a friction block (72) is in charge of modeling said friction forces as denoted "$F_{friction}$".

In this particular example, the acceleration parameter "$A_{sensor}$" is not used to determine the force applying on the control stick. However, as already explained, any combination of acceleration parameter "$A_{sensor}$", velocity parameter "$V_{sensor}$" and position parameter "$X_{sensor}$" may be used to determine a force applying on any other control loading device.

The force signals "$F_{spring}$" and "$F_{friction}$" obtained are summed into a summer (73) as per the Newton's $2^{nd}$ law applied to the control stick. The resulting desired response force signal "$F_{des}$" (52) models the force exerted by the real aircraft stick on the pilot hand.

Figure 5:
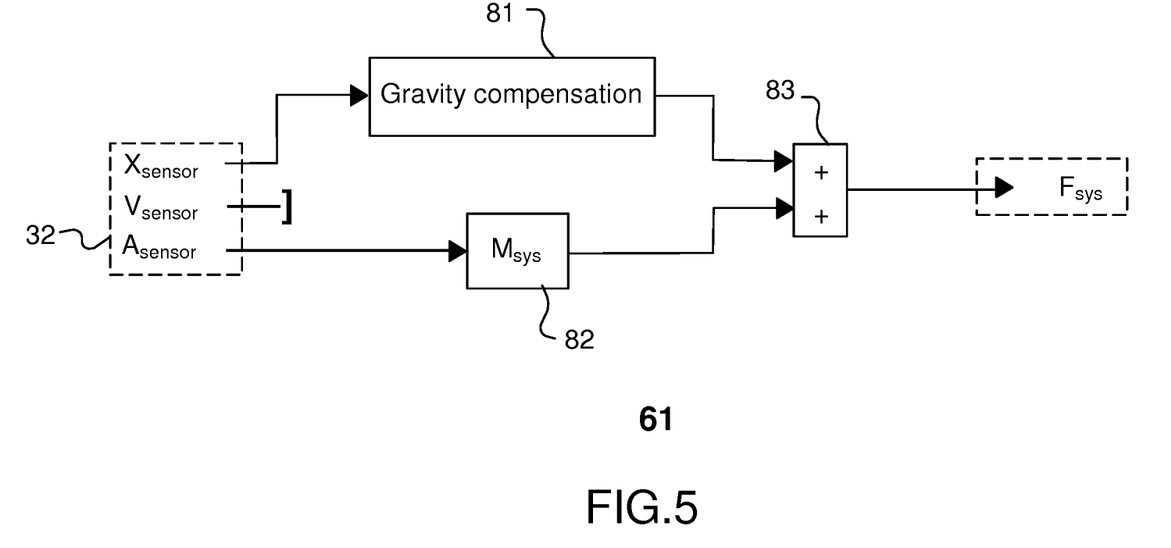
FIG. 5 details the system compensation model block of FIG. 3 in accordance with an embodiment of the present invention.

Turning now to FIG. 5, a detailed system compensation model module (61) in accordance with an embodiment of the present invention is shown in the context of an aircraft simulator. In this example, the position signal representing the position parameter "$X_{sensor}$" is fed to a gravity compensation module (81) which outputs a gravity compensation force signal representative of the gravitation force "$F_{grav}$" applied to the simulator control stick based on its position. In a preferred embodiment, the gravitation force is obtained from a look up table filled with values measured experimentally directly on the simulator, using the force sensor value "$F_{sensor}$" along with the position parameter "$X_{sensor}$".

In parallel, the acceleration control signal is amplified by an amplifier (82) in application of the Newton's 2nd law: $F=m*A$, wherein 'F' being the amplifier output and '$m=M_{sys}$' being the mechanical inertia of the simulator control stick or the equivalent mass, and '$A=A_{sensor}$' being the acceleration of the simulator control stick. The amplifier output is an inertia compensation force signal representative of the force due to the inertia of the mechanical parts of the simulator control stick, thus constituting an inertia compensation.

The gravity compensation force and the inertia compensation force are summed in a summer (83) to obtain a system compensation force represented by the system compensation force signal "$F_{sys}$" which compensates the mechanical effects due to gravity and mechanical parts inertia of the simulated control stick.

The person skilled in the art would easily devise that other effects or forces could also be added to the system compensation model (61) for having for example simulator control stick friction compensation or mechanical slack compensation.

Figure 6:
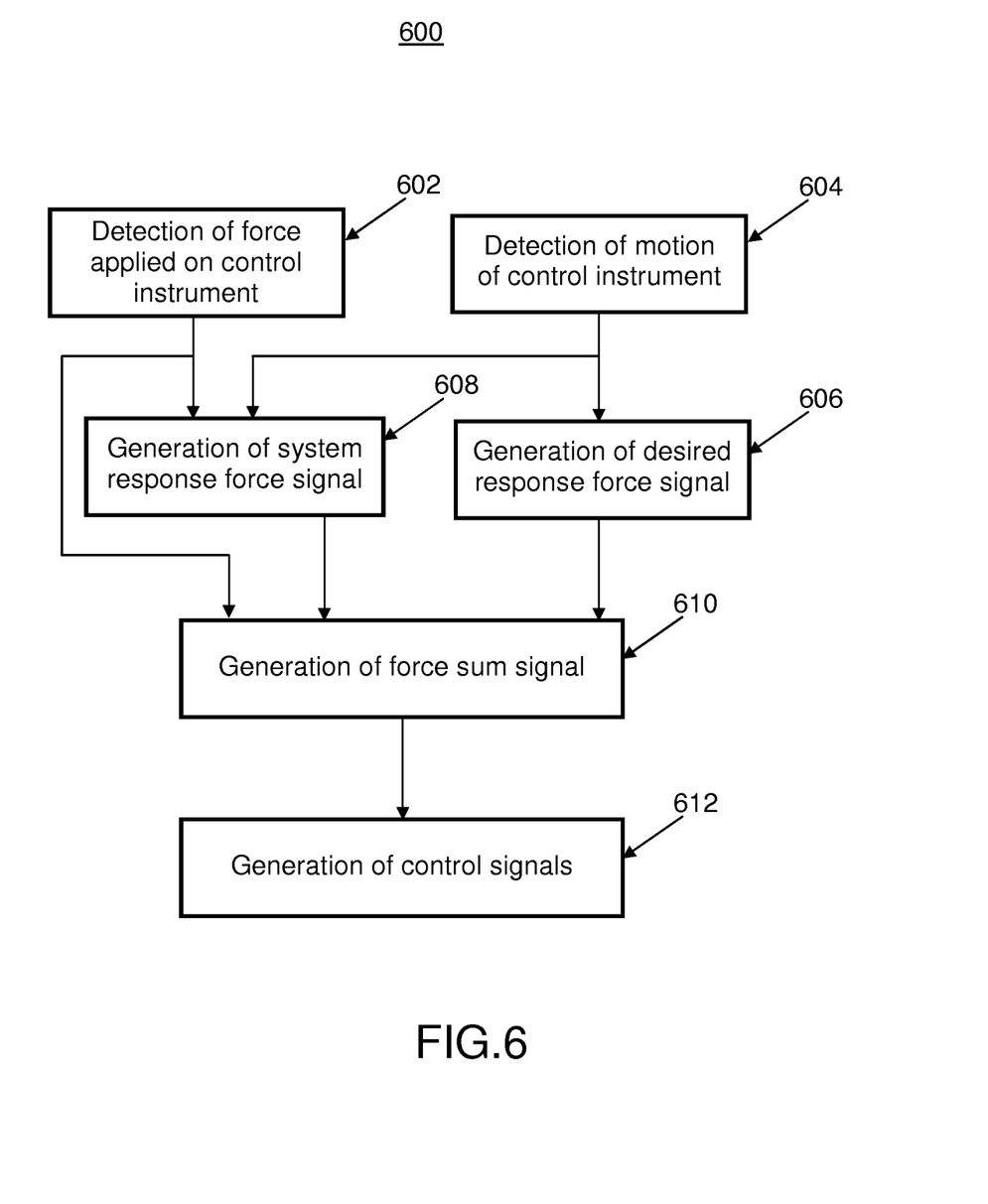
FIG. 6 is a flow chart of the process to compensate control loading mechanical effects in accordance with an embodiment of the present invention.

Turning to FIG. 6, a flow diagram of the process to compensate control loading mechanical effects in accordance with an embodiment of the present invention is now described. Process 600 begins when feedback control loop is operating. In a first step (602), the process allows detecting a force applied on the simulated control instrument and generating a force sensor signal.

The process allows then detecting the motion parameters relative to the motion of the control instrument (604). In an embodiment, the motion parameters cover acceleration, velocity and position of the control instrument resulting from motion of an actuator.

On a next step (606), the motion parameters allow computing a desired response force signal that represents the forces that would be exerted by the desired system to reproduce. In an embodiment, the motion parameters are fed to a desired response model module which allows generating the desired response force signal.

Simultaneously, the motion parameters and the force sensor signal are used to generate a system response force signal (step 608) that represents the forces exerted by the behaviour of some mechanical parts of the system. In an embodiment, a system response model module is used to generate the system response force signal. In a preferred embodiment, the system response model combines a system compensation model module representing the mechanical effects of the system with a saturation device that allows saturating the system compensation force signal to a saturation range determined by the force sensor signal.

In a next step (610), the process allows generating a force sum signal based on the desired response force signal, the system response force signal and the force sensor signal. In a preferred embodiment, the sum represents the application of the Newton's $2^{nd}$ law ($\Sigma F=m*a$) to all the forces that apply to the system.

In a next step (612), the process allows generating control signals from the force sum signal. The control signals are obtained by determining the right part of the Newton's $2^{nd}$ law equation, i.e. determining the "a" term, with "a" being the system desired acceleration. From this acceleration, the desired velocity and the desired position of the system are computed. The control signals are composed of any combination of these three values (acceleration, velocity, position).

The control signals may then be used to control an actuator that is in charge of executing the control signals to control the control instrument.

While the invention has been described in details for a Control Loading System of an aircraft simulator, and particularly for a CLS of a pilot's control stick, it has to be appreciated that the invention can be used for either any other control instruments in the domain of aircraft or flight simulation and for any control instruments in the more general domain of simulation where mechanical effects needs to be compensated based on a force sensor signal.

Finally, it is to be appreciated that in a preferred embodiment, the invention is implemented in software, which includes but is not limited to firmware, resident software, microcode. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The invention claimed is:

1. A computer implemented method for controlling a control instrument of a simulation system reproducing a desired system, in response to a force applied onto said control instrument, comprising:

detecting a force applied onto the control instrument of the simulation system, and generating a force sensor signal representing the detected force;

detecting a motion of the control instrument and generating motion parameters;

generating a desired response force signal from the motion parameters, the desired response force signal representing the forces that would be exerted by the desired system to reproduce;

generating a system response force signal from the force sensor signal and the motion parameters, the system response force signal representing the forces exerted by the behaviour of mechanical parts of the simulation system;

generating a force sum signal from the desired response force signal, the system response force signal and the force sensor signal; and generating control signals from the force sum signal.

2. The method of claim 1, wherein the step of generating a desired response force signal is operated by a desired response model module and comprises the step of modelizing mechanical forces of a desired system such as spring force or friction force.

3. The method of claim 1, wherein the step of generating a system response force signal comprises the steps of generating a system compensation force signal and of saturating the system compensation force signal to a saturation range determined by the force sensor signal.

4. The method of claim 3, wherein the step of generating a system compensation force signal comprises a step of generating gravity compensation force signal representative of gravitation force applied to the control instrument and inertia compensation force signal representative of inertia of the mechanical parts of the control instrument.

5. The method of claim 1, wherein the step of generating control signals comprises the step of generating control signals representative of a control command.

6. The method of claim 1, wherein the step of generating control signals comprises generating a combination of acceleration control signal, velocity control signal and position control signal.

7. The method of claim 1, further comprising a step of applying the control signals on an actuator that is in charge of executing those control signals to control the control instrument.

8. A system for controlling a control instrument of a simulation system in response to a force applied onto said control instrument, the system comprising means for operating each step of the method according to claim 1.

9. The system of claim 8, wherein the simulation system is an aircraft simulator and the control instrument is a pilot's control stick.

10. A computer readable medium having encoded thereon a computer program comprising instructions for carrying out the steps of the method of claim 1 when the computer program is executed on a computer.

* * * * *